(12) United States Patent
Shimozono et al.

(10) Patent No.: US 7,599,128 B2
(45) Date of Patent: *Oct. 6, 2009

(54) IMAGING LENS (75) Inventors: Hiroaki Shimozono, Koriyama (JP); Koichi Murata, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/923,851

(22) Filed: Oct. 25, 2007

(65) Prior Publication Data

US 2008/0055536 A1 Mar. 6, 2008

Related U.S. Application Data (63) Continuation of application No. PCT/JP2006/308228, filed on Apr. 19, 2006.

(30) Foreign Application Priority Data

Apr. 25, 2005 (JP) ............................. 2005-126499

(51) Int. Cl.
G02B 3/08 (2006.01)
G02B 1/06 (2006.01)
G02B 3/12 (2006.01)

(52) U.S. Cl. ..................................... 359/742

(58) Field of Classification Search ................ 359/742, 359/666, 691, 721
See application file for complete search history.

(56) References Cited

U.S. PATENT DOCUMENTS

| 6,166,784 A | 12/2000 | Murata et al. |
| 6,882,482 B2 * | 4/2005 | Ogasawara .................. 359/666 |
| 2007/0127348 A1 | 6/2007 | Ooi et al. |

FOREIGN PATENT DOCUMENTS

| JP | 62-170934 | 7/1987 |
| JP | 2-289806 | 11/1990 |
| JP | 9-230300 | 5/1997 |
| JP | 10-73758 | 3/1998 |
| JP | 10-104491 | 4/1998 |
| JP | 2002-357804 | 12/2002 |
| JP | 3094156 | 3/2003 |

* cited by examiner

*Primary Examiner*—Alicia M Harrington
(74) *Attorney, Agent, or Firm*—Oblon, Spivak, McClelland, Maier & Neustadt, L.L.P.

(57) ABSTRACT

An imaging lens is provided, whose lens characteristics can be switched between e.g. normal imaging and close-up imaging without requiring mechanically movable mechanism or attachment/removal of another lens. Switching of lens function is realized by combining a liquid crystal diffraction lens and a refractive lens and applying a voltage to a liquid crystal layer of the liquid crystal lens. The liquid crystal lens is constituted by two liquid crystal lenses that are laminated together so that their polarization directions producing lens functions are perpendicular to each other, which suppresses chromatic aberration and achieves good imaging characteristics by appropriately selecting focal lengths and Abbe numbers.

10 Claims, 5 Drawing Sheets

IMAGING LENS

TECHNICAL FIELD

The present invention relates to an imaging lens.

BACKGROUND ART

In order to switch an imaging mode of an imaging optical system between normal imaging and close-up imaging, it has been necessary to use such a method as constituting the imaging lens by a plurality of lenses and moving at least one lens of the plurality of lenses along an optical axis (JP-A-10-104491) or attaching another lens to the front of the imaging lens (JP-U-3094156) at the time of switching the imaging mode from normal imaging to close-up imaging.

DISCLOSURE OF THE INVENTION

Problems to be Solved by the Invention

In the method of moving a lens along the optical axis as disclosed in JP-A-10-104491, a movable mechanism for moving a lens along the optical axis is required, assembly of the movable mechanism and optical adjustment are required at a time of producing the imaging optical system, and time-dependent deterioration of performances due to e.g. wearing of movable portions is unavoidable. Further, in the method of attaching another lens at a time of close-up imaging as disclosed in JP-U-3094156, a device for attaching or removing such another lens or for storing the lens when it is not attached, is required, which makes the construction of the imaging optical system complicated and prevents its downsizing.

Means to Solve the Problem

The present invention has the following gists.

1. An imaging lens comprising a liquid crystal lens and a refractive lens laminated together;

the refractive lens being a refractive lens having a positive refractive power;

the liquid crystal lens comprising: a pair of transparent substrates disposed so as to be opposed to each other, a Fresnel diffraction lens surface and a transparent electrode formed on one of the opposed two surfaces of the pair of transparent substrates, a transparent electrode formed on the other one of the opposed two surfaces of the pair of transparent substrates, and a liquid crystal layer filling the concave/convex portion and sandwiched between the transparent substrates;

the Fresnel diffraction lens surface having a saw-tooth-shaped cross section and consisting of concentrically arranged annular concave/convex portions;

wherein the liquid crystal lens is configured so that the alignment state of the liquid crystal layer is changeable by applying a voltage to the liquid crystal layer by supplying a power from an external power source to the transparent electrode; and wherein the imaging lens is configured so that its focal length is changeable by changing the applied voltage to the liquid crystal lens.

2. An imaging lens comprising a laminated liquid crystal lens and a refractive lens laminated together;

the refractive lens being a refractive lens having a positive refractive power;

the laminated liquid crystal lens comprising first and second liquid crystal lenses;

each of the first and second liquid crystal lenses comprising a pair of transparent substrates disposed so as to be opposed to each other, a Fresnel diffraction lens surface and a transparent electrode formed on one of the two opposed surfaces of the pair of transparent substrates, a transparent electrode formed on the other one of the opposed two surfaces of the pair of transparent substrates, and a liquid crystal layer filling the concave/convex portion and sandwiched between the transparent substrates;

the Fresnel diffraction lens surface having a saw-tooth-shaped cross section and consisting of concentrically arranged annular concave/convex portions;

wherein the liquid crystal lens is configured so that its refractive power for linearly polarized light of predetermined polarization direction is changeable by changing alignment state of liquid crystal layer by applying a voltage to the liquid crystal layer by supplying a power to the transparent electrodes from an external power source;

wherein the laminated liquid crystal lens comprising the first liquid crystal lens and the second liquid crystal lens laminated so that their predetermined polarization directions are perpendicular to each other; and wherein the imaging lens is configured so that its focal length is changeable by changing the applied voltage to the laminated liquid crystal lens.

3. The imaging lens according to the above 2, wherein the phase functions of the respective Fresnel diffraction lens surfaces of the respective liquid crystal lenses constituting the laminated liquid crystal lens, are different from each other.

4. The imaging lens according to the above 1, 2 or 3, which satisfies the following formula:

$$0 \leq -(1/f_D + 1/f_R) \cdot (1/\upsilon_R) / \{1/(f_D \cdot \upsilon_D) + (1/f_R \cdot \upsilon_R)\} \leq 2$$

provided that the focal length and the Abbe number of the liquid crystal lens are $f_D$ and $\upsilon_D$, respectively, and the focal length and the Abbe number of the refractive lens having a positive refractive power are $f_R$ and $\upsilon_R$, respectively.

5. The imaging lens according to any one of the above 1 to 4, wherein the liquid crystal layer shows the refractive index substantially equal to the ordinary refractive index $n_o$ of the liquid crystal for linearly polarized light polarized in a direction perpendicular to the predetermined polarization direction regardless of the magnitude of the applied voltage, and the liquid crystal lens satisfies any one of the following requirements (1) to (4):

(1) The liquid crystal layer of the liquid crystal lens is made of a nematic liquid crystal having a negative dielectric anisotropy, the alignment direction of liquid crystal molecules is substantially perpendicular to the substrate surfaces and the refractive index of the liquid crystal layer for linearly polarized light polarized in the predetermined polarization direction is substantially equal to the ordinary refractive index $n_o$ when the liquid crystal lens is in off-state of no voltage application, and the alignment direction is substantially parallel with substrate surfaces and the refractive index of the liquid crystal layer for linearly polarized light polarized in the predetermined polarization direction substantially equals to the extraordinary refractive index $n_e$ ($n_e \neq n_o$) when the liquid crystal lens is in on-state of voltage application, and the Fresnel diffraction lens surface is made of a transparent isotropic material of refractive index $n_F$ substantially equal to the ordinary refractive index $n_o$ of the liquid crystal layer.

(2) The liquid crystal layer of the liquid crystal lens is made of a nematic liquid crystal having a positive dielectric anisotropy, the alignment direction of liquid crystal molecules is substantially parallel with the substrate surfaces and the refractive index of the liquid crystal layer for linearly polarized light polarized in the predetermined polarization direction is substantially equal to the extraordinary refractive index $n_e$ when the liquid crystal lens is in off-state of no voltage application, and the alignment direction is substantially perpendicular to substrate surfaces and the refractive index of the liquid crystal layer for linearly polarized light polarized in the predetermined polarization direction substantially equals to the ordinary refractive index $n_o$ ($n_e \neq n_o$) when the liquid crystal lens is in on-state of voltage application, and the Fresnel diffraction lens surface is made of a transparent isotropic material of refractive index $n_F$ substantially equal to the ordinary refractive index $n_o$ of the liquid crystal layer.

(3) The liquid crystal layer of the liquid crystal lens is made of a nematic liquid crystal having a positive dielectric anisotropy, the alignment direction of liquid crystal molecules is substantially parallel with the substrate surfaces and the refractive index of the liquid crystal layer for linearly polarized light polarized in the predetermined polarization direction is substantially equal to the extraordinary refractive index $n_e$ when the liquid crystal lens is in off-state of no voltage application, and the alignment direction is substantially perpendicular to the substrate surfaces and the refractive index of the liquid crystal layer for linearly polarized light polarized in the predetermined polarization direction is substantially equal to the ordinary refractive index $n_o$ ($n_e \neq n_o$) when the liquid crystal lens is in on-state of voltage application, and the Fresnel diffraction lens surface is made of a transparent birefringent material having an extraordinary refractive index $n_{Fe}$ substantially equal to the extraordinary refractive index $n_e$ of the liquid crystal layer and an ordinary refractive index $n_{Fo}$ substantially equal to the ordinary refractive index $n_o$ of the liquid crystal layer, and the transparent birefringent material shows $n_{Fe}$ for linearly polarized light of the predetermined polarization direction and $n_{Fo}$ for linearly polarized light polarized in a direction perpendicular to the predetermined polarization direction.

(4) The same as (1) or (2) except that the Fresnel diffraction lens surface of the liquid crystal lens is made of a transparent isotropic material of refractive index $n_F$ substantially equal to the extraordinary refractive index $n_e$ of the liquid crystal layer instead of the transparent isotropic material of refractive index $n_F$ substantially equal to the ordinary refractive index $n_o$ of the liquid crystal layer, and the liquid crystal lens is provided with a polarization phase correction surface for canceling a phase difference occurred in linearly polarized light polarized in a direction perpendicular to the predetermined polarization direction.

6. The imaging lens according to any one of the above 1 to 4, wherein the liquid crystal lens is a liquid crystal lens in which $\Delta n \times d$ being a product of $\Delta n$ multiplied by a depth d [nm] of the concave/convex portion of the Fresnel diffraction lens satisfies the following formula:

$$390 \times m \leq \Delta n \times d \leq 650 \times m$$

(wherein m=1, 2 or 3)

provided that $|n_1 - n_F|$ and $|n_2 - n_F|$, whichever smaller, is defined as $\Delta n$, wherein $n_1$ and $n_2$ are refractive indexes of the liquid crystal layer for linearly polarized light of the predetermined polarization direction at no voltage application and at voltage application respectively, and $n_F$ is the refractive index of the Fresnel diffraction lens surface.

7. The imaging lens according to the above 6, wherein a phase correction surface having a concave/convex shape consisting of arranged annular shapes is formed on the opposed surface of said the other transparent substrate of the liquid crystal lens on which the Fresnel diffraction lens surface is not formed, so that the center of the phase correction surface agrees with the center of the Fresnel diffraction lens surface, and the transparent electrode is formed on the phase correction surface.

8. An imaging lens whose mode is switchable between normal imaging and close-up imaging by switching the refractive power of the liquid crystal lens as defined in any one of the above 1 to 7 between a state of substantially zero refractive power and a state of positive refractive power by switching presence and absence of the voltage application.

Effects of the Invention

The imaging lens of the present invention is configured so that its lens function is changeable by a voltage applied from the outside. Since the movable mechanism is unnecessary, the structure is simplified, which makes assembly and adjustment easy and enables downsizing. Further, since no mechanical wearing occurs, reliability is improved. Further, it is possible to switch the lens function at high speed.

BRIEF DESCRIPTION OF THE DRAWINGS

FIG. 6: A graph showing behaviors of phase differences produced by a liquid crystal lens (a) having no phase correction layer and a liquid crystal lens (b) having a phase correction layer, in response to applied voltages.

EXPLANATION OF REFERENCE NUMERALS

2: Fresnel diffraction lens surface, liquid crystal layer and transparent electrode, etc. of first liquid crystal lens
4: Fresnel diffraction lens surface, liquid crystal layer and transparent electrode, etc. of second liquid crystal lens
5: Quartz glass substrate
6: Refractive lens
7: Aspherical surface
8: Aspherical surface
9: Aperture
10: Laminated liquid crystal lens
10A: First liquid crystal lens
10B: Second liquid crystal lens
11: Quartz glass substrate
11A, 11B: Quartz glass substrate
12: Quartz glass substrate
13, 13A, 13B: Seal
14, 14A, 14B: Liquid crystal layer
15, 15A, 15B, 16, 16A, 16B: Transparent electrode
17, 17A, 17B: Fresnel diffraction lens surface
18: Phase correction surface
19: External power source
20: Liquid crystal lens having polarization phase correction surface
21: Transparent substrate
22: Polarization phase correction surface
23: Isotropic material layer

BEST MODE FOR CARRYING OUT THE INVENTION

Embodiments of the imaging lens of the present invention are described with reference to drawings, but there are various embodiments of the imaging lens of the present invention other than ones described in this specification, and thus, the embodiments are not limited to the following descriptions.

Figure 1:
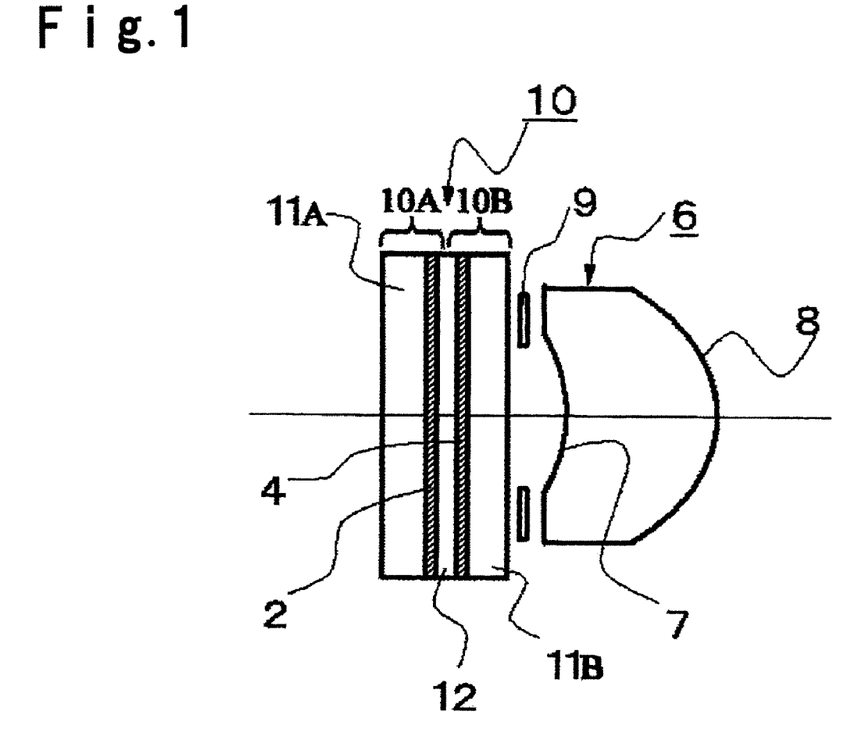
FIG. 1: A schematic cross-sectional view of an imaging lens of the present invention.

The imaging lens of the present invention whose schematic cross-sectional view is shown in FIG. 1, comprises a laminated liquid crystal lens 10, an aperture 9, a single lens 6 having aspherical surfaces 7 and 8 and having positive refractive power, that are disposed in this order from the object side so that they share a single optical axis. The aperture 9 may be disposed in the object side of the laminated liquid crystal lens 10, or the single lens (refractive lens) 6 may be divided by a plane in the lens and the aperture 9 may be sandwiched between the divided pieces. Further, instead of the single lens 6 having a positive refractive power, a refractive lens group having a positive refractive power or a plurality of refractive lens groups may be employed and the laminated liquid crystal lens 10 may be disposed in the middle of the refractive lens group or between the refractive lens groups. Further, from the object side, the single lens 6 having a positive refractive power, the aperture 9 and the laminated liquid crystal lens may be disposed in this order.

Figure 2:
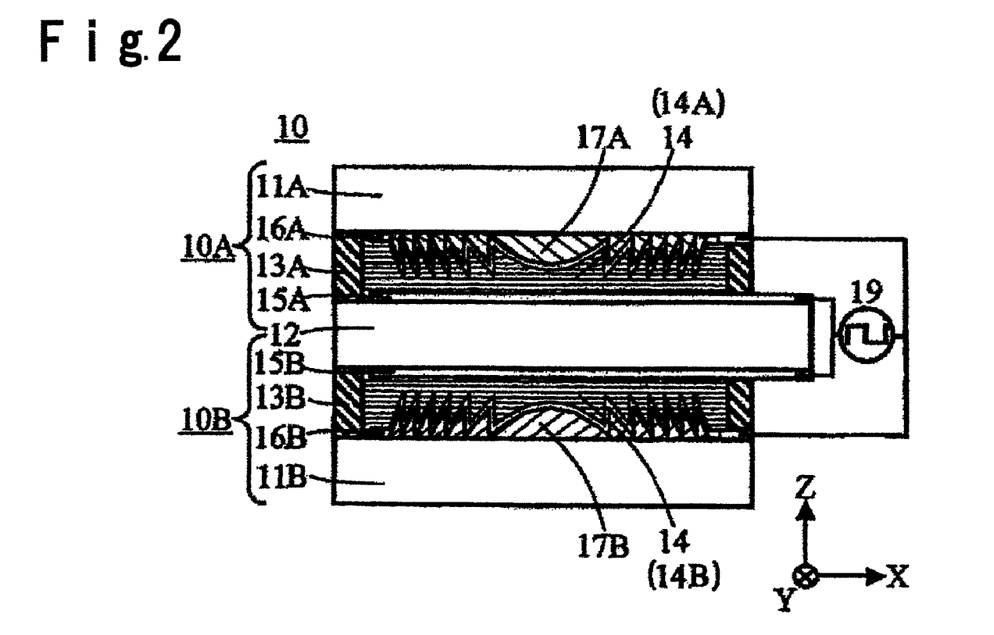
FIG. 2: A schematic cross-sectional view of a laminated liquid crystal lens employed in the imaging lens of the present invention.

First of all, the laminated liquid crystal lens 10 is described with reference to the schematic cross-sectional view of FIG. 2, but the laminated liquid crystal lens employed in the imaging lens of the present invention is not limited to the following embodiments. The laminated liquid crystal lens 10 comprises a first liquid crystal lens 10A and a second liquid crystal lens 10B laminated together so that their polarization directions (hereinafter referred to as predetermined polarization directions) in which the respective liquid crystal lenses have lens functions, are perpendicular to each other. By constructing an imaging lens having a laminated liquid crystal lens thus laminated, it is possible to obtain an imaging lens whose lens function is switchable regardless of polarization state of incident light and having good imaging characteristics, such being preferred.

The first and the second liquid crystal lenses 10A and 10B are formed by employing respective pair of transparent substrates (11A and 12, 11B and 12), and share the transparent substrate 12 as one of each pair of transparent substrates. On the transparent substrates 11A and 11B of the respective liquid crystal lenses, respective Fresnel diffraction lens surfaces (hereinafter simply referred to as Fresnel diffraction lens surfaces) 17A and 17B each consisting of concentrically arranged annular concave/convex portions made of a transparent material and having a saw-tooth-shaped cross section, and respective transparent electrodes 16A and 16B are provided, and on both surfaces of the transparent substrate 12, respective transparent electrodes 15A and 15B are provided. After Fresnel diffraction lens surfaces 17A and 17B, transparent electrodes 15A, 16A, 15B and 16B and alignment films are formed, each pair of the transparent substrates are press-bonded so that their surfaces on which these components are formed are opposed to each other and so as to have a desired distance by providing in the peripheries a seal 13A or 13B in which spacers are mixed, to form a cell. Subsequently, from injection ports (not shown) provided in the seals, a liquid crystal is injected so as to fill concave portions of the Fresnel diffraction lens surfaces 17A and 17B and gaps between the transparent substrates (concave/convex portions), and the injection ports are sealed, to form the liquid crystal layers 14A and 14B to constitute the first and the second liquid crystal lenses 10A and 10B. To the liquid crystal layers 14A and 14B of the respective liquid crystal lenses, voltages can be applied by applying voltages between the transparent electrodes 15A and 16A and between 15B and 16B respectively, by using an external power source 19.

The first and the second liquid crystal lenses may be formed so as to share one of the pair of transparent substrates as described above, but these liquid crystal lenses may be produced separately and laminated to be integrated. Further, in FIG. 2, the Fresnel diffraction lens surfaces 17A and 17B are formed on the transparent substrates 11A and 11B respectively, but they may be formed on the transparent substrate 12.

Surfaces of the transparent substrates to contact with the liquid crystal are preferably provided with alignment treatments. In a case of forming a horizontal alignment in which a liquid crystal is aligned substantially in parallel with substrate surfaces at a time of no voltage application, it is preferred to form a polyimide film and apply a horizontal alignment treatment in which the surface is rubbed in one direction, but the method is not limited thereto, and another horizontal alignment treatment may be used. Particularly, in a case of forming a homogeneous alignment in which the liquid crystal layer is aligned horizontally with respect to the substrate surfaces, the directions of rubbing treatments, namely, alignment treatment directions of opposed transparent substrates, are preferably the same. Namely, in a case where a vertical alignment is desired, in which the liquid crystal is aligned substantially vertically with respect to the substrate surfaces at a time of no voltage application, it is preferred to apply a vertical alignment treatment to one of the substrate surfaces by a vertical alignment film of e.g. amino silane type, and to apply a horizontal alignment treatment in one direction to the other substrate surface in order to control orientation of the liquid crystal in the surface at a time of voltage application. However, the method is not limited thereto, and another vertical alignment treatment method may also be employed.

Further, instead of the imaging lens construction in which two liquid crystal lenses that are the first and the second liquid crystal lenses, are laminated and provided, the imaging lens construction may be such that only a single liquid crystal lens is provided. In this construction, for example, an imaging lens having a lens function only for linearly polarized incident light of one of the polarization directions, is realized.

It is sufficient that the transparent substrate employed in the present invention is a flat substrate made of a transparent material at an wavelength of light used in the imaging lens, and it may, for example, be a flat substrate made of an inorganic material such as a quartz glass or an optical glass, a transparent substrate made of a resin such as polycarbonate or an acrylic resin. In order to avoid effect of birefringence of substrate, an isotropic transparent material is preferred. A flat plate of a quartz glass or an optical glass is preferably employed since they do not show birefringence and are excellent in durability. The thickness of the transparent substrate is, for example, from 0.05 to 1.0 mm, but the thickness is not limited thereto.

The transparent electrode for applying a voltage to the liquid crystal layer, is preferably an oxide transparent conductive film such as an ITO (indium oxide doped with tin oxide) film, AZO (aluminum-doped zinc oxide) film or a GZO (gallium-doped zinc oxide) film since they have high transparency and conductivity.

The Fresnel diffraction lens surface is formed by fabricating a surface of the transparent substrate by such a method as cutting, pressing or photolithography and etching. In this step, the Fresnel diffraction lens surface may be formed by fabricating a surface of the transparent substrate itself, but it may be formed by forming a transparent material layer on the transparent substrate and fabricating the layer by the above-mentioned method. As the transparent material of the layer formed on the transparent substrate, any one of various types of inorganic materials or organic materials such as photosensitive resins or thermosetting resins. As the inorganic material, a $SiO_xN_y$ film (x and y represent atomic ratios of O and N respectively based on Si), a $SiO_2$ film, a $Si_3N_4$ film, an $Al_2O_3$ film, etc. may be employed. Among these, a $SiO_xN_y$ film is preferably employed since its refractive index is adjustable to a desired refractive index by changing x and y by film-forming conditions, and the film is excellent in transparency and durability. As the organic material, a photosensitive polyimide or a polymer liquid crystal is employed, and particularly in a case of forming the Fresnel diffraction lens surface by a birefringent material, a photopolymerizable polymer liquid crystal is preferably employed since its refractive index and alignment direction are controllable by characteristics, composition or alignment treatment of a liquid crystal compound to be employed.

Optical design of Fresnel diffraction lens surface can be conducted by using a known phase function method. Namely, a phase function OPD(r) being a function of the distance r from the center of annular shape being the optical axis of a liquid crystal lens, is represented by the following formula:

$$OPD(r)=a_2r^2+a_4r^4+a_6r^6+\ldots \quad (1)$$

($a_2, a_4, a_6, \ldots$ are coefficients of terms)

By using this formula, the design can be conducted by using the coefficients $a_2, a_4, a_6, \ldots$ of the terms as parameters. Here, the optical path difference OPD(r) of formula (1) is in a unit of [μm] and r is in a unit of [mm]. Further, the design may be made by using a function type other than the phase function of formula (1). Further, a function type capable of expressing aspherical lenses or rotationally asymmetric anamorphic lenses may also be used.

Figure 3:
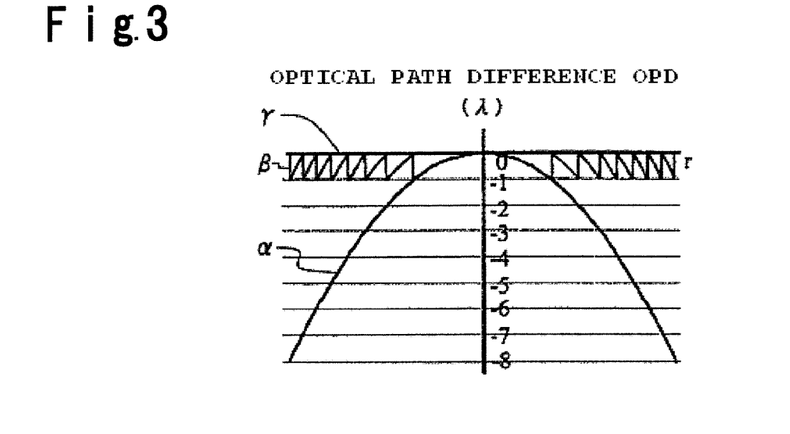
FIG. 3: A graph showing an optical path difference in a transmission wavefront produced by a liquid crystal lens, wherein α is a graph showing the optical path difference in a unit of wavelength λ in relation to the distance r from the center, β is a graph showing an optical path difference being a phase difference of from 0 to λ produced by slicing the optical path difference of α at an interval of wavelength λ and projecting the sliced optical path differences on a plane of optical path difference 0, and γ is a graph showing optical path difference 0 having no transmission wavefront change.

FIG. 3 shows a specific example of phase function OPD(r) curve represented by formula (1). The plot α represents optical path differences at various points r with respect to the optical axis center (r=0), which is in a unit of wavelength λ of incident light. Since transmission wavefronts between which there is an optical path difference of an integer times of wavelength λ of incident light, can be regarded as equivalent, plot β of a saw-tooth shape produced by slicing plot α at an interval of wavelength λ and projecting the sliced plots on a plane of optical path difference 0, becomes an optical path difference substantially equal to plot α. Accordingly, by forming concave/convex portions constituting a saw-tooth shape corresponding to plot β having a concave/convex depth d corresponding to an optical path difference λ, a Fresnel diffraction lens surface can be obtained, which has a desired refractive power corresponding to plot α for light in a wavelength band centering the wavelength λ, with shallow concave/convex depth d. Here, an optical path difference is defined as a product of a refractive index difference between a transparent material forming convex portions of the Fresnel diffraction lens surface and a medium filling the concave portions, multiplied by the distance the light propagates. A liquid crystal lens employing such a Fresnel diffraction lens surface is preferred since fabrication of concave/convex portions becomes easy and the liquid crystal layer can be thin, which enables to lower driving voltage and improves response.

In order to obtain good imaging characteristics in the entire region of visible light region, the wavelength λ corresponding to the depth of the concave/convex portions of the Fresnel diffraction lens surface is preferably determined in the range of from 500 to 550 nm. Namely, the product Δn×d of the refractive index difference Δn between the liquid crystal layer and the Fresnel diffraction lens surface multiplied by the depth d [nm] of the concave/convex portion of the Fresnel diffraction lens surface, satisfies the following formula in a state that the liquid crystal lens has a lens function for linearly polarized light of the predetermined polarization direction:

$$(m-0.25)\times 500 \leq \Delta n \times d \leq (m+0.25)\times 550$$

(wherein $m=1, 2$ or $3$)

By this construction, focal lengths for a light beam of an wavelength in a visible region are present, which correspond to respective M pieces (here, M is a natural number of at least 2) of predetermined voltages among voltages V applied between the first and second transparent electrodes for producing voltages applied to the liquid crystal layer, and thus, a liquid crystal lens is realized, whose state is switchable between a state of having a lens function and a state having no lens function for a light beam of wavelength in a visible region, such being preferred. Particularly, when the following formula is satisfied:

$$(m-0.25)\times 520 \leq \Delta n \times d < (m+0.25)\times 520$$

(wherein $m=1, 2$ or $3$)

further excellent imaging characteristics can be obtained in the entire wavelength region of visible light beam, such being more preferred.

Here, when m=1, namely, when the following formula is satisfied:

$$375 \leq \Delta n \times d \leq 687.5,$$

a liquid crystal lens is realized, whose state is switchable between a state having a lens function with good efficiency and a state having no lens function for a light beam of wavelength in a visible region. Further, when the following formula is satisfied:

$$390 \leq \Delta n \times d \leq 650,$$

presence and absence of lens function for a light beam of wavelength in a visible region, is switchable and more excellent imaging characteristics are obtained in the entire wavelength region of visible light beam, such being more preferred.

The first liquid crystal lens and the second liquid crystal lens are preferably designed to have different focal lengths by the distance between the Fresnel lens surfaces when the liquid crystal lenses are laminated. By this optical design, better imaging characteristics can be obtained when a laminated liquid crystal lens is formed. Here, the focal length $f_D$ is represented by the following formula using $a_2$ as a coefficient of $r^2$:

$$f_D = \pi/(\lambda \cdot a_2).$$

Further, an Abbe number $\upsilon_D$ is defined by the following formula provided that wavelengths used for the imaging lens are $\lambda_1$, $\lambda_2$ and $\lambda_3$ ($\lambda_1 < \lambda_2 < \lambda_3$):

$$\upsilon_D = (n(\lambda_2)-1)/(n(\lambda_1)-n(\lambda_3)) \quad (2)$$

Namely, provided that $\lambda_1$=486 nm (F line), $\lambda_2$=589 nm (D line) and $\lambda_3$=656 nm (C line), $\upsilon_D$ becomes −3.46 (refer to Kogaku vol. 25, No. 12 (1996), p. 685). Here, for example, $n(\lambda_2)$ means a refractive index for D line.

The refractive lens to be used for the imaging lens of the present invention has positive refractive power, whose aberration is corrected for an object at a substantially infinite distance, and it may be a single lens whose both surfaces are aspherical surfaces, a lens group constituted by a plurality of lenses combined together, or a lens comprising a plurality of lens groups combined together.

When a single lens is employed, the single lens is preferably one whose both surfaces are aspherical surfaces. Such an aspherical shape can be determined by the following formula (3). In formula (3), j represents a surface of the lens. For example, in a case of biconvex lens, the lens has two surfaces and j=1, 2. i (here, i=2, 4, 6, 8, 10 . . . ) represents an aspherical order number. h represents an image height from the optical axis, $z_j$ represents the distance from a tangential plane tangent to the summit of the j-th aspherical plane to a point on the aspherical plane at an image height of h, and $r_j$, $k_j$ and $a_{i,j}$ are coefficients.

$$z_j = (1/r_j)h^2/[1+\{1-(1+k_j)(1/r_j)^2h^2\}^{0.5}] + \Sigma a_{i,j}h^i \quad (3)$$

When a single lens is employed as the refractive lens, its Abbe number is determined by a material employed, and for example, when a polymethyl methacrylate resin is employed, the Abbe number is 57.4.

In the imaging lens of the present invention, by combining a liquid crystal lens whose refractive power is switchable with a lens having positive refractive power, a function of switching focal length of the imaging lens is realized. Particularly, when the liquid crystal lens has zero refractive power, imaging of an object at an infinite distance is possible, and when the liquid crystal lens has a positive lens function, by equalizing the distance from an object surface to the imaging lens to substantially the focal length of the liquid crystal lens, close-up imaging becomes possible.

In the imaging lens of the present invention, in order to realize good imaging characteristics in every state of the imaging lens produced by switching the lens function of the imaging lens, it is preferred that the value of the following formula is at least 0 and at most 2 with respect to all of switchable focal lengths $f_D$ Of the liquid crystal lens;

$$-(1/f_D + 1/f_R) \cdot (1/\upsilon_R)/\{1/(f_D \cdot \upsilon_D) + (1/f_R \cdot \upsilon_R)\} \quad (4)$$

wherein $\upsilon_D$ is an Abbe number of the liquid crystal lens and $f_R$ is the focal length and $\upsilon_R$ is the Abbe number of the refractive lens having a positive refractive power.

By satisfying this relation, good imaging characteristics with sufficiently small chromatic aberration is realized in each state of refractive power of the liquid crystal lens, that is switched for use, in the imaging lens of the present invention. When the value of formula (4) is larger than 2, chromatic aberration of the imaging lens of the present invention increases, such being not preferred. In order to achieve better chromatic aberration, the value of formula (4) is preferably at most 1.5. On the other hand, when the value is smaller than 0, the effect of switching focal length by the liquid crystal lens decreases, such being not preferred. Further, the value is preferably at least 0.5 to increase the effect of switching focal length by the liquid crystal lens.

When the Fresnel diffraction lens surface of the liquid crystal lens has a construction that on a transparent substrate the Fresnel diffraction lens surface is formed and subsequently a transparent electrode is formed thereon, it is possible to lower drive voltage of the liquid crystal lens, such being preferred.

Further, the Fresnel diffraction lens surface of the liquid crystal lens may have a construction that on the transparent substrate the transparent electrode is formed first, and subsequently the Fresnel diffraction lens surface is formed. In this construction, it is easy to form a transparent electrode having uniform conductivity in the entire substrate, and disconnection and short circuit less likely occur, which improves reliability, such being preferred. In this case, the distance between the Fresnel diffraction lens surface and a transparent electrode on a transparent substrate opposed to the Fresnel diffraction lens surface, is preferably at most 10 μm in terms of the distance between the portion of concave/convex portions where its thickness is maximum and the surface of the substrate opposed to the concave/convex portions, in order to increase response speed of the liquid crystal lens or to enable low voltage driving. On the other hand, when the distance is too much narrowed, the possibility of short circuit increases, and for this reason, the distance is preferably at least 0.5 μm. Further, in the same reason, the distance is at least 1 μm and at most 3 μm.

Here, when the electric volume resistivity $\rho_F$ of the transparent material is sufficiently lower than the electric volume resistivity $\rho_{LC}$ of the liquid crystal, specifically, when $\rho_F/\rho_{LC}$ is at most $10^{-5}$, a voltage applied between two opposed transparent electrodes of each liquid crystal lens is effectively applied to the liquid crystal layer, the refractive index of the liquid crystal layer in the entire region of Fresnel diffraction lens is uniform, and the effective shape of the Fresnel diffraction lens surface is determined by the uniform refractive index of the liquid crystal layer and geometric shape of the concave/convex portions. However, when the electric volume resistivity $\rho_F$ of the transparent material of the concave/convex portions of the Fresnel diffraction lens is not sufficiently lower than the electric volume resistivity $\rho_{LC}$ of the liquid crystal, specifically, when $\rho_F/\rho_{LC}$ exceeds $10^{-5}$, voltage $V_{LC}$ applied to the liquid crystal layer changes depending on the height $d_F$ of the concave/convex portions of the Fresnel diffraction lens surface, and thus, substantial refractive index $n_{LC}$ of the liquid crystal layer has a spatial distribution. Accordingly, the optical shape of the Fresnel diffraction lens is determined by the refractive index $n_F$ and the height $d_F$ of the transparent material of the concave/convex portions, the refractive index $n_{LC}$ of the liquid crystal having a spatial distribution, and the distance between the thickest portion of the concave/convex portions and the surface of the substrate opposed to the concave/convex portions. Accordingly, the distance is preferably adjusted to optimize the diffraction efficiency, in addition to the above-mentioned conditions.

In the liquid crystal lens employed in the imaging lens of the present invention, the liquid crystal layer provided in the liquid crystal lens preferably shows a refractive index substantially equal to the ordinary refractive index $n_o$ of the liquid crystal for linearly polarized light polarized in a direction perpendicular to the predetermined polarization direction regardless of the above applied voltage, and the liquid crystal layer preferably has a construction satisfying any one of the following requirements (1) to (4).

(1) The liquid crystal layer of the liquid crystal lens is made of a nematic liquid crystal in which a dielectric anisotropy $\Delta\in(\in_{//}-\in_{\perp})$ being the difference between the specific dielectric constant $\in_{//}$ in the long axis direction of liquid crystal molecules and the specific dielectric constant $\in_{\perp}$ in the short axis direction of liquid crystal molecules, is negative; the liquid crystal layer has a vertical alignment in which the liquid crystal molecules are aligned substantially perpendicularly to the liquid crystal layer when the liquid crystal layer is in off-state at a time of no voltage application, and has a horizontal alignment in which the liquid crystal molecules are aligned in a predetermined direction in the liquid crystal layer when the liquid crystal layer is in on-state at a time of voltage application. Further, the Fresnel diffraction lens surface is made of a transparent isotropic material having a refractive index substantially equal to the ordinary refractive index $n_o$ of the liquid crystal layer.

(2) The liquid crystal layer of the liquid crystal lens is made of a nematic liquid crystal having a positive dielectric anisotropy ($\Delta\in>0$) and shows a horizontal alignment in which liquid crystal molecules are aligned in the predetermined polarization direction in the liquid crystal layer when the liquid crystal lens is in off-state of no voltage application, and shows a vertical alignment in which the liquid crystal molecules are aligned substantially perpendicularly to the liquid crystal layer when the liquid crystal lens is in on-state of voltage application. Further, the Fresnel diffraction lens surface is made of a transparent isotropic material of a refractive index substantially equal to the ordinary refractive index $n_o$ of the liquid crystal layer.

(3) The liquid crystal layer of the liquid crystal lens is made of a nematic liquid crystal having a positive dielectric anisotropy ($\Delta\in>0$), and shows a horizontal alignment in which liquid crystal molecules are aligned in the predetermined direction in the liquid crystal layer when the liquid crystal lens is in off-state of no voltage application, and shows a vertical alignment in which the liquid crystal molecules are aligned substantially perpendicularly to the liquid crystal layer when the liquid crystal lens is on-state of voltage application. Further, the Fresnel diffraction lens surface is made of a transparent birefringent material having an extraordinary refractive index $n_{Fe}$ substantially equal to the extraordinary refractive index $n_e$ of the liquid crystal layer and an ordinary refractive index $n_{Fo}$ substantially equal to the ordinary refractive index $n_o$ of the liquid crystal layer, and the transparent birefringent material shows $n_{Fe}$ for linearly polarized light of the predetermined polarization direction and $n_{Fo}$ for linearly polarized light polarized in a direction perpendicular to the predetermined polarization direction.

(4) The same as (1) or (2) except that the Fresnel diffraction lens surface of the liquid crystal lens is made of a transparent isotropic material of refractive index $n_F$ substantially equal to the extraordinary refractive index $n_e$ of the liquid crystal layer instead of the transparent isotropic material of refractive index $n_F$ substantially equal to the ordinary refractive index $n_o$ of the liquid crystal layer, and the liquid crystal lens is provided with a polarization phase correction surface for canceling a phase difference occurred to linearly polarized light polarized in a direction perpendicular to the predetermined polarization direction.

Explanations of these constructions are as follows.

In the construction of (1), a time of no voltage application, there is substantially no refractive index difference between the liquid crystal layer and the Fresnel diffraction lens surface, and thus, the liquid crystal layer has no lens function. As the voltage is increased, the liquid crystal molecules are aligned in a direction perpendicular to the electric field and in the direction of horizontal alignment treatment applied to the surface opposed to the Fresnel diffraction lens surface, whereby the refractive index of the liquid crystal layer for linearly polarized light of the predetermined polarization direction becomes close to the extraordinary refractive index $n_e$ to form a refractive index difference from the Fresnel diffraction lens surface, and thus, the liquid crystal layer becomes to have a lens function. According to this construction, it is possible to realize by a simple construction a lens function controllable in such a manner that the liquid crystal lens has no lens function at a time of no voltage application and has a lens function at a time of voltage application, such being preferred. Further, since there is no need of providing a horizontal alignment treatment to the concave/convex portions of the Fresnel diffraction lens, uniform alignment is easily obtained, such being preferred.

In the construction of (2), at a time of no voltage application, the liquid crystal layer has a lens function produced by a refractive index difference between the liquid crystal layer and the Fresnel diffraction lens surface. As the voltage is increased, the liquid crystal molecules are aligned in the direction of electric field, and when the liquid crystal molecules are aligned in the vertical direction, the liquid crystal layer shows no lens function. According to this construction, it is possible to realize with a simple construction a lens function controllable in such a manner that the liquid crystal lens has no lens function at a time of voltage application and has a lens function at a time of no voltage application, such being preferred.

Further, in the construction of (1) or (2), it is possible to obtain a large refractive index difference between the liquid crystal layer and the Fresnel diffraction lens surface for linearly polarized light of the predetermined polarization direction in a state that the liquid crystal lens has a lens function, whereby the depth of the concave/convex portions of the Fresnel diffraction lens surface can be shallow and its fabrication is simplified. Further, for linearly polarized light polarized in a direction perpendicular to the predetermined polarization direction, the liquid crystal layer always shows the ordinary refractive index $n_o$, and there is substantially no refractive index difference from the Fresnel diffraction lens surface, and thus, no phase difference is generated.

In the construction of (3), the Fresnel diffraction lens surface is made of a transparent birefringent material, the liquid crystal lens has no lens function at a time of no voltage application, and as the applied voltage increases, the refractive index of the liquid crystal layer for linearly polarized light of the predetermined polarization direction approaches to the ordinary refractive index $n_o$, and thus, the liquid crystal lens becomes to have a lens function. Further, for linearly polarized light polarized in a direction perpendicular to the predetermined polarization direction, the liquid crystal layer always shows the ordinary refractive index $n_o$ and there is no substantial refractive index difference between the liquid crystal layer and the Fresnel diffraction lens surface, and thus, no phase difference is generated. In this construction, since a large refractive index difference is obtained between the liquid crystal layer and the Fresnel diffraction lens surface for linearly polarized light of the predetermined polarization direction at a time of voltage application, the depth of the concave/convex portions of the Fresnel diffraction lens surface can be shallow and its fabrication is simplified, such being preferred. Further, it is possible to realize with a simple construction a lens function controllable in such a manner that the liquid crystal lens has no lens function at a time of no voltage application and has a lens function at a time of voltage application. When a polymer liquid crystal formed by photo-polymerizing a photo-polymerizable liquid crystal composition is employed as the transparent birefringent material forming the Fresnel diffraction lens surface in this construction, characteristics such as refractive index are adjustable by selecting various liquid crystal compositions and blending them as the case requires, such being preferred.

In the constructions of (2) and (3), instead of the liquid crystal of horizontal alignment, a liquid crystal of hybrid alignment may be employed, in which a vertical alignment treatment is applied to a surface on which the Fresnel diffraction lens surface is formed and a horizontal alignment treatment is applied to a substrate surface opposed to the surface. In this construction, no horizontal alignment treatment needs to be applied to the concave/convex surface of the Fresnel diffraction lens surface, and thus, no disturbance of alignment occurs, such being preferred. In this case, the liquid crystal layer shows a refractive index substantially equal to $(n_o+n_e)/2$ for linearly polarized light polarized in a direction parallel with the horizontal alignment treatment direction at a time of no voltage application, and shows the ordinary refractive index $n_o$ at a time of voltage application. Further, the liquid crystal layer always shows the ordinary refractive index $n_o$ for linearly polarized light polarized in a direction perpendicular to the horizontal alignment treatment direction.

In the liquid crystal lens having a construction of (1) or (2), when the Fresnel diffraction lens surface is made of a transparent isotropic material of refractive index $n_F$ substantially equal to the extraordinary refractive index $n_e$ of the liquid crystal layer instead of the transparent isotropic material of refractive index $n_F$ substantially equal to the ordinary refractive index $n_o$ of the liquid crystal layer, the liquid crystal lens always produces a phase difference for linearly polarized light polarized in a direction perpendicular to the predetermined polarization direction. The construction of (4) is further provided with a polarization phase correction surface for canceling the phase difference. In this construction, the liquid crystal lens always produces no phase difference for linearly polarized light polarized in a direction perpendicular to the predetermined polarization direction, and thus, it is possible to realize a liquid crystal lens whose state is switchable between a state of having a lens function and a state of having no lens function, such being preferred.

Figure 9:
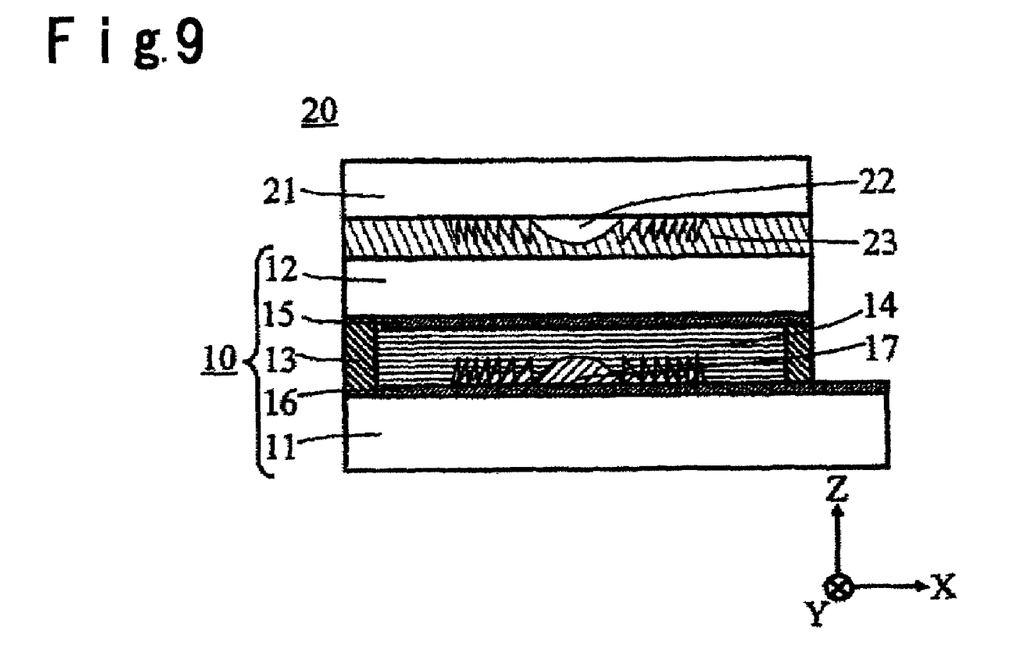
FIG. 9: A schematic cross-sectional view of imaging characteristics of a liquid crystal lens provided with a polarization phase correction surface, employed in the imaging lens of the present invention.

A liquid crystal lens 20 provided with the polarization phase correction surface, is described with reference to FIG. 9. In the construction of FIG. 9, a transparent substrate 21 on which a polarization phase correction surface 22 of a Fresnel diffraction lens shape made of a transparent birefringent material is formed, is fixed to a transparent substrate 12 being one of the transparent substrates of a liquid crystal lens 10 by an isotropic material layer 23 filling concave portions of the Fresnel diffraction lens surface.

The polarization phase correction surface 22 is produced by fabricating a polymer liquid crystal layer formed on the transparent substrate 21 to which horizontal alignment treatment is applied, into a Fresnel diffraction lens shape. The transparent substrate 21 on which the polarization phase correction surface 22 is formed, is fixed by an isotropic material layer 23 filling a gap between the substrates and filling concave portions of the polarization phase correction surface 22. Here, the transparent substrate 21 is laminated so that the horizontal alignment treatment direction of the polarization phase correction surface 22 and the predetermined polarization direction of the liquid crystal lens 10 are perpendicular to each other. The isotropic material of the isotropic material layer 23 is a material having a refractive index substantially equal to the ordinary refractive index of the polymer liquid crystal layer. The polarization phase correction surface 22 is designed so that it does not change transmission wavefront for linearly polarized light of the predetermined polarization direction of the liquid crystal lens 10, and it produces a phase difference for linearly polarized light polarized in a direction perpendicular to the predetermined polarization direction for canceling a phase difference always produced by the liquid crystal lens 10 in the polarization direction.

In this construction, it is possible to realize with a simple construction a lens function controllable in such a manner that for linearly polarized light of the predetermined polarization direction, the liquid crystal lens has no lens function at a time of no voltage application or voltage application and has a lens function at a time of voltage application or no voltage application respectively. Further, since a large refractive index difference can be obtained between the liquid crystal layer and the Fresnel diffraction lens surface for linearly polarized light of the predetermined polarization direction in a state that the liquid crystal lens has a lens function, the concave/convex portions of the Fresnel diffraction lens surface can be shallow and its fabrication becomes easy. Further, for linearly polarized light polarized in a direction perpendicular to the predetermined polarization direction, the liquid crystal layer always shows the ordinary refractive index no and produces substantially no refractive index difference from the Fresnel diffraction lens surface, and thus, produces no phase difference. Further, since the ordinary refractive index and the extraordinary refractive index of the polymer liquid crystal forming the polarization phase correction layer 22 are not restricted by the ordinary refractive index $n_o$ and the extraordinary refractive index $n_e$ of the liquid crystal of the liquid crystal lens, there is a merit that selection of the material of the polymer liquid crystal is flexible.

Further, as another embodiment, in the construction of (1) or (2), the Fresnel diffraction lens surface of the liquid crystal lens may be made of a transparent isotropic material of refractive index $n_F$ substantially equal to the extraordinary refractive index $n_e$ of the liquid crystal layer instead of the transparent isotropic material of refractive index $n_F$ substantially equal to the ordinary refractive index $n_o$ of the liquid crystal layer, and the liquid crystal lens may be a liquid crystal lens provided with no polarization phase correction surface described in (4). By such a construction, it is possible to realize with a simple construction a liquid crystal lens whose lens function is switchable for linearly polarized light of the predetermined polarization direction between voltage application and no voltage application to control the liquid crystal lens. In this construction, since a large refractive index difference can be obtained between the liquid crystal layer and the Fresnel diffraction lens surface for linearly polarized light of the predetermined polarization direction, the concave/convex portions of the Fresnel diffraction lens surface can be shallow and its fabrication becomes easy. Further, for linearly polarized light polarized in a direction perpendicular to the predetermined polarization direction, there is always a refractive index difference between the liquid crystal layer and the Fresnel diffraction lens surface and the liquid crystal lens always has a lens function. Accordingly, by laminating two liquid crystal lenses of this construction so that their predetermined polarization directions in which their lens functions can be controlled, are perpendicular to each other, a laminated liquid crystal lens can be obtained, whose lens function is switchable regardless of polarization state of incident light by switching the state of the laminated liquid crystal lens between a state that one of the two liquid crystal lenses has a lens function and a state that both of them have lens functions.

As still another embodiment of a liquid crystal lens to be employed for the imaging lens of the present invention, instead of the constructions of the above (1) to (4), the construction may be such that the liquid crystal layer shows always the ordinary refractive index $n_o$ for linearly polarized light polarized in a direction perpendicular to the above predetermined polarization direction and its refractive index for linearly polarized light of the predetermined polarization direction changes from $n_1$ in off-state at a time of no voltage application to $n_2$ in on-state at a time of voltage application, the refractive index $n_F$ of the Fresnel diffraction lens surface has a value between $n_1$ and $n_2$, and provided that $|n_1-n_F|$ or $|n_2-n_F|$ whichever smaller ($|n_1-n_{Fo}|$ or $|n_2-n_{Fe}|$ whichever smaller when the Fresnel diffraction lens surface is made of a birefringent material (its ordinary refractive index is $n_{Fo}$ and its extraordinary refractive index is $n_{Fe}$)) is designated as $\delta n$, a product $\delta n \times dF$ produced by multiplying $\delta n$ by the depth $dF$ [nm] of the concave/convex portions of the Fresnel diffraction lens surface satisfies the following formula:

$$(m-0.25) \times 500 \leq \delta n \times d_F \leq (m+0.25) \times 550$$

(wherein m is a natural number of at least 1).

According to this construction, it is possible to realize a liquid crystal lens having (2m+1) pieces of focal lengths corresponding to (2m+1) pieces of applied voltages $V_k$ at which the refractive index $n(V_k)$ of the liquid crystal layer satisfies the following formula:

$$n(V_k) = n_1 + [(m-k)/m] \times (n_s - n_1)$$

(wherein k is an integer satisfying that $-m \leq k \leq m$).

Particularly, when the following formula is satisfied:

$$(m-0.25) \times 520 \leq \delta n \times d_F \leq (m+0.25) \times 520$$

(wherein m is a natural number), more excellent imaging characteristics are obtained in the entire wavelength region of visible light beam, such being preferred.

In this construction, a liquid crystal lens can be obtained, whose refractive power is switchable among positive, zero and negative refractive powers by changing applied voltage to the liquid crystal layer. By using such a liquid crystal lens in combination with a refractive lens, an imaging lens is obtained, whose lens function is widely changeable, such being preferred.

Figure 5:
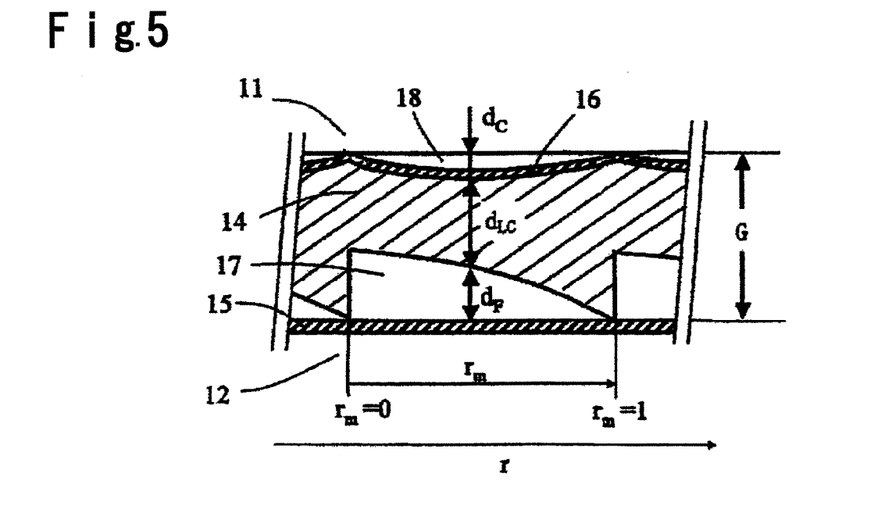
FIG. 5: A schematic cross-sectional view of an annular portion of a liquid crystal lens having a phase correction layer, employed in the imaging lens of the present invention.

The liquid crystal lens may have such a construction that on a transparent substrate of the liquid crystal lens opposed to the plane on which the Fresnel diffraction lens surface is produced, first of all, a phase correction surface 18 consisting of annular concave/convex shapes is formed with an isotropic transparent material of refractive index $n_C$ so that its optical axis agrees with the optical axis of the Fresnel diffraction lens surface, and a transparent electrode 16 is formed on the phase correction surface (refer to FIG. 5).

FIG. 5 is a schematic cross-sectional view of an m-th annular zone and its vicinity of a Fresnel diffraction lens surface 17 of the first or the second liquid crystal lens employed in the imaging lens of the present invention. In the annular zone m of the Fresnel diffraction lens surface 17, a coordinate system $r_m$ normalized by the width of the annular zone is defined, and the optical axis side of the annular zone m is defined as $r_m=0$ and its outer peripheral side is defined as $r_m=1$. Since the thickness of the transparent electrode is sufficiently thin, the distance G between opposed transparent substrates is regarded as equal to the sum of the concave/convex thickness $d_F(r_m)$ of the Fresnel lens surface 17, the thickness $d_{LC}(r_m)$ of the liquid crystal layer 14 and the concave/convex thickness $d_C(r_m)$ of the phase correction surface 18.

$$G = d_F(r_m) + d_{LC}(r_m) + d_C(r_m)$$

Further, an effective voltage $V_{LC}$ applied to the liquid crystal layer 14 changes according to the specific dielectric constant $\in_F$ of the material constituting the Fresnel diffraction lens surface 17 and the thickness $d_F(r_m)$ of the Fresnel diffraction lens surface. Specifically, provided that an AC voltage applied between the transparent electrodes 15 and 16 is V, $V_{LC}$ is represented by the following formula.

$$V_{LC} = V / \{1 + (\in_{LC}/\in_F) \times (d_F/d_{LC})\} \quad (5)$$

Here, $\in_{LC}$ is an effective specific dielectric constant of the liquid crystal layer 14. Since the specific dielectric constant $\in_{//}$ in the long axis direction of liquid crystal molecules is different from the specific dielectric constant $\in_\perp$ in their short axis direction, the specific dielectric constant $\in_{LC}$ of the liquid crystal layer 14 changes according to change of the orientation of liquid crystal molecules when the alignment state is changed by application of voltage. Accordingly, the effective voltage $V_{LC}$ represented by formula (5) applied to the liquid crystal layer, is regarded as a function of the position $r_m$ on the Fresnel diffraction lens surface. Accordingly, hereinafter the voltage is represented by $V_{LC}(r_m)$ as a function of $r_m$.

In FIG. 5, an optical path $OP(r_m)$ of light transmitted between the transparent substrates 11 and 12, is the sum of optical paths produced in mediums of the phase correction surface 18, the liquid crystal layer 14 and the Fresnel diffraction lens surface 17, and is represented by the following formula:

$$OP(r_m) = \{n_F \times d_F(r_m) + n_{LC}(V_{LC}(r_m)) \times d_{LC}(r_m) + n_C \times d_C(r_m)\}/\lambda \quad (6)$$

Here, $n_F$, $n_{LC}$ and $n_C$ represent refractive indexes of the Fresnel diffraction lens surface, the liquid crystal layer and the phase correction surface respectively for linearly polarized light of the predetermined polarization direction. Accordingly, when light passes between the transparent substrates, a phase difference $r_m$ produced between light incident into a position $r_m$ on the annular zone and light incident into a position $r_m=0$, is a function of $r_m$, and provided that the phase difference is represented by $OPD(r_m)$, the following formula is satisfied:

$$OPD(r_m) = \{OP(r_m) - OP(0)\}/\lambda = \{n_F \times d_F(r_m) + n(V_{LC}(r_m)) \times d_{LC}(r_m) + n_C \times d_C(r_m) - n_F \times d_F(0) - n(V_{LC}(0)) \times d_{LC}(0) - n_C \times d_C(0)\}/\lambda \qquad (7)$$

Namely, since substantial refractive index $n(V_{LC}(r_m))$ of the liquid crystal layer changes according to the position $r_m$, the phase difference $OPD(r_m)$ may deviate from a designed phase difference by an optical calculation. Accordingly, in order to correct such a deviation, it is preferred to provide the above-mentioned phase correction surface.

This feature is described in more detail with reference to a liquid crystal lens as an example, in which the refractive index $n_F$ of the isotropic transparent material constituting the Fresnel diffraction lens surface is a medium value between the refractive index $n_1$ of the liquid crystal layer in off-state at a time of no voltage application for linearly polarized light of the predetermined polarization direction and a refractive index $n_2$ of the liquid crystal layer in on-state at a time of voltage application, and the liquid crystal layer always shows the ordinary refractive index $n_o$ for linearly polarized light polarized in a direction perpendicular to the predetermined polarization direction, whereby the liquid crystal lens produces positive, zero and negative refractive powers by switching an applied voltage to the liquid crystal layer.

Figure 4:
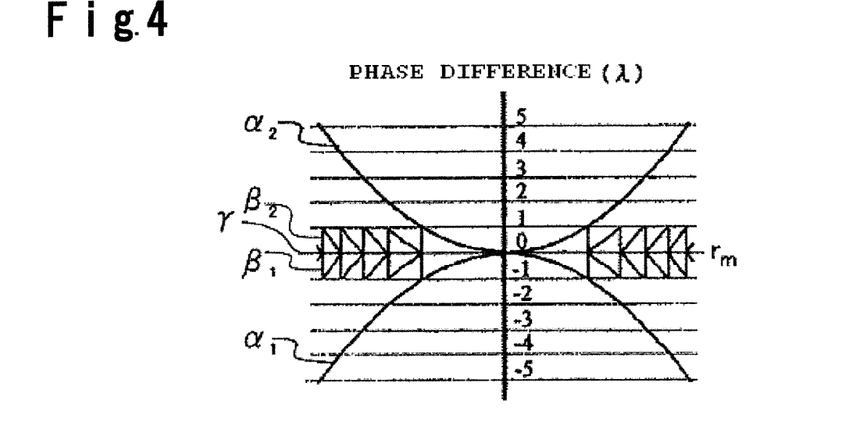
FIG. 4: A graph showing an optical path difference in a transmission wavefront produced by the liquid crystal lens, wherein $α_1$ and $α_2$ are graphs each showing an optical path difference in a unit of wavelength λ in relation to radial position r in the lateral axis, $β_1$ and $β_2$ are graphs each showing an optical path difference of from 0 to λ produced by slicing the respective optical path differences of $α_1$ and $α_2$ at an interval of λ and projecting the sliced optical path differences on a plane of optical path difference 0, and γ is a graph showing optical path difference 0 having no transmission wavefront change.
Figure 6:
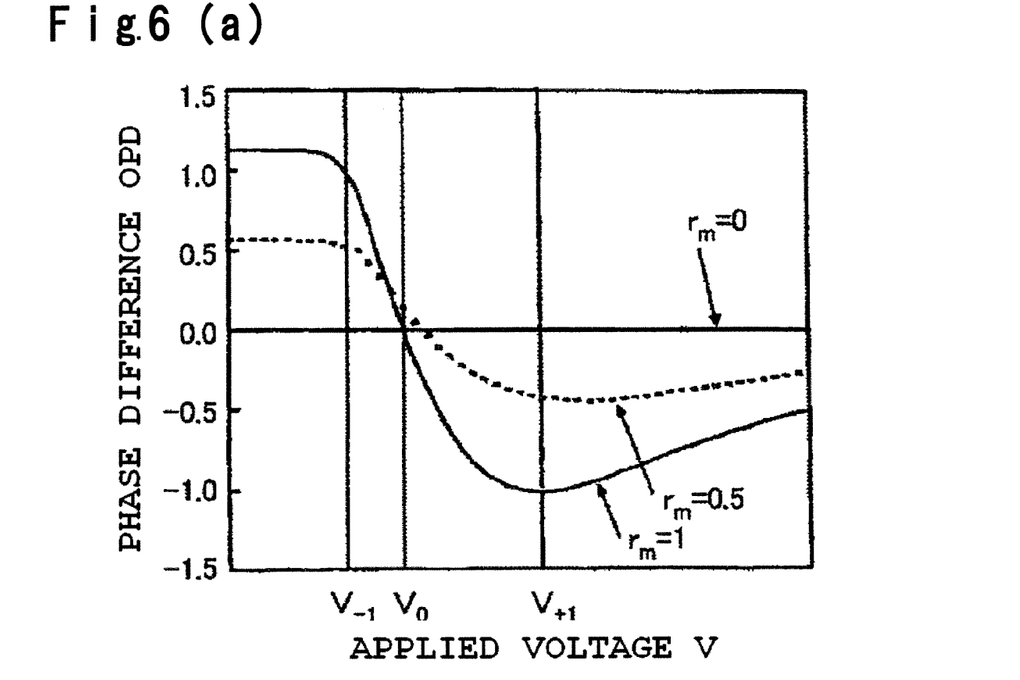

FIG. 6 is a schematic view showing a change of a phase difference $OPD(r_m)$ produced in an annular zone of the Fresnel diffraction lens surface in response to an applied voltage V. The graph shown in FIG. 6(a) shows a case of liquid crystal lens construction having no phase correction surface and the graph shown in FIG. 6(b) shows a case of the construction of the liquid crystal lens having a phase correction surface, and in each of FIGS. 6(a) and 6(b), the solid line shows a case of $OPD(r_m=1)$ and the broken line shows a case of $OPD(r_m=0.5)$. At a voltage $V_1$ where the phase difference at $r_m=1$, namely $OPD(r_m=1)$, becomes substantially $-\lambda$, a plane wave incident into the liquid crystal lens is modulated as represented by $\beta_1$ of FIG. 4, and as a result, transformed into a wavefront containing a positive power as a +1-st diffraction wavefront as represented by $\alpha_1$ of FIG. 4, to be a convergent light. On the other hand, at a voltage $V_{-1}$ at which $OPD(1) \approx \lambda$, a plane wave incident into the liquid crystal lens is modulated as represented by $\beta_2$ of FIG. 4, and as a result, transformed into a wavefront containing negative power as a $-1$-st diffraction wavefront as represented by $\alpha_2$, to be a divergent light. Further, at a voltage $V_0$ at which $OPD(1) \approx 0$, incident wavefront does not change, and thus, convergent point of light beam does not change ($\gamma$ in FIG. 4). However, in FIG. 6(a) as a construction having no phase correction surface, a phase difference $OPD(0.5)$ at the center of an annular zone of the Fresnel diffraction lens surface 17 does not become 0 at this time. This is because substantial refractive index $n_{LC}(V_{LC}(r_m))$ of the liquid crystal layer changes according to the position $r_m$ in the annular zone, and thus, there occurs a problem that a phase shift is caused to produce a wavefront aberration. Such a problem becomes significant as $\in_{LC}/\in_F$ increases.

On the other hand, in FIG. 6(b) as a construction having a phase correction surface, by designing the refractive index $n_C$ and the thickness $d_C(r_m)$ of the material forming the phase correction surface so that a product produced by multiplying the refractive index difference from the phase correction surface to the liquid crystal layer by the thickness $d_C(r_m)$ cancels the phase deviation, it is possible to substantially remove the phase difference at the voltage $V_0$ in the entire region of the annular zone, to avoid disturbance of wavefront. For example, when $n_C < n(V_{LC})$ is satisfied at the voltage $V_0$, it is sufficient that the phase correction surface 18 has a shape convex at the center.

Phase correction by the phase correction surface is effectively applicable in the same manner to a liquid crystal lens which produces a phase difference produced by slicing the above phase difference $\alpha$ at an interval of wavelength $m \cdot \lambda$ (m is 2 or 3), and whose state is switchable between a state of zero refractive power and a plurality of states of positive or negative refractive powers, other than to a liquid crystal lens whose refractive power is switchable among refractive powers of positive, zero and negative. Namely, in the liquid crystal lens of this construction, the substantial refractive index $n(V_{LC})$ of the liquid crystal layer 14 changes according to the position $r_m$ in an annular zone, and disturbance of wavefront may occur at each refractive power, but the present invention can effectively prevent such a problem.

Thus, by carrying out phase correction by the phase correction surface, it is possible to improve imaging efficiency at each refractive power. In the above explanation, a liquid crystal lens whose refractive power is switchable among positive, zero and negative is used as an example, but the phase correction surface is also applicable in a case of liquid crystal lens whose refractive power is switchable among a plurality of stages of positive or negative refractive powers and zero refractive power, and the phase correction surface enables to obtain a desired phase in an annular zone at each of refractive powers among which the refractive power is switchable, such being preferred.

Further, in the liquid crystal lens element of the present invention, by providing a Fresnel diffraction lens surface between a pair of electrodes and providing the phase correction surface outside the pair of electrodes, design of electrooptical characteristics of obtainable phase difference is highly flexible by selection of e.g. refractive indexes and dielectric constants of the liquid crystal and the Fresnel diffraction lens surface, the concave/convex thickness and the liquid crystal layer thickness, and thus, it is possible to easily realize a phase difference of desired distribution in the plane and further to achieve low-voltage drive or to produce various types of transmission wavefronts.

As a preferred embodiment employing an imaging lens of the present invention, an imaging lens capable of switching its imaging mode between normal imaging and macroimaging, or capable of switching zooming range, is mentioned.

Examples are described below.

EXAMPLE 1

FIG. 1 is a cross-sectional view of an imaging lens according to an embodiment of the present invention. The imaging lens of this example has from the object side, a laminated liquid crystal lens 10 being a lamination of a first liquid crystal lens 2 and a second liquid crystal lens, an aperture 9 and a refractive lens 6 made of resin and having a positive refractive power. FIG. 2 shows a schematic cross-sectional view of the laminated liquid crystal lens 10 to be employed in the imaging lens of this example. For the transparent substrates 10A and 10B of the laminated liquid crystal lens, quartz glass substrates of 0.5 mm thick are employed, and for the transparent substrate 12, a quartz glass substrate of 0.1 mm thick is employed. For the liquid crystal, a nematic liquid crystal is employed, which has a negative dielectric anisotropy, an ordinary refractive index $n_o$ of 1.52 and an extraordinary refractive index $n_e$ of 1.75.

Fresnel diffraction lens surfaces 17A, 17B are formed by fabricating $SiO_xN_y$ films (x and y are the ratios of O and N based on Si in terms of number of atoms) formed on the transparent substrates 10A and 10B respectively by photolithography and reactive ion etching. The isotropic and transparent $SiO_xN_y$ films are formed by a reactive sputtering method in a mixed gas atmosphere formed by mixing oxygen and nitrogen in Ar gas, wherein x and y are adjusted so that the refractive index $n_x$ of the film becomes 1.52. The film thickness d of the $SiO_xN_y$ films is 2.3 μm to produce an optical path difference corresponding to a wavelength 520 nm between the $SiO_xN_y$ films and the liquid crystal layer whose refractive indexes are 1.75 and 1.52 respectively.

Respective Fresnel diffraction lens surfaces of the first and second liquid crystal lenses are optically designed by using a known phase function method under an assumption that the object plane is located at a position 20 mm distant from the object-side surface of the transparent substrate 11A, and the focal lengths $f_1$, $f_2$ of the first and second liquid crystal lenses are 22.31 mm and 22.30 mm respectively. Namely, first of all, coefficients $a_2$, $a_4$ and $a_6$ of the phase function of formula (1) are obtained, and as a result, they are as shown in Table 1 and Table 2 in the cases of the first and the second liquid crystal lenses 2 and 4 respectively. Here, coefficients of the terms $r^8$ or higher order are all zero.

TABLE 1

| $a_2$ | −238.943562 |
|---|---|
| $a_4$ | 34.004413 |
| $a_6$ | 0 |

TABLE 2

| $a_2$ | −239.112426 |
|---|---|
| $a_4$ | 37.875216 |
| $a_6$ | 0 |

By slicing the plot α in FIG. 3 that is a transmission wavefront at a time of no voltage application represented by formula (1) using the values of the coefficients $a_2$ to $a_6$ in Tables 1 and 2, at an interval of optical path difference corresponding to a wavelength 520 nm, the saw-tooth shaped plot β in FIG. 3 is obtained. Photolithography and dry etching are repeated to microfabricate the $SiO_xN_y$ film into a Fresnel diffraction lens surface having a shape of plot β approximated by multistage steps to produce the optical path difference.

Subsequently, on the Fresnel diffraction lens surfaces, ITO films being transparent conductive films are formed by a sputtering method to be used as first transparent electrodes 16A and 16B. Further, on the first transparent electrodes 16A and 16B, polyimide films are applied so that they have a film thickness of about 50 nm and baked, and their surfaces are subjected to a rubbing treatment to form alignment films (not shown). Further, on both surfaces of the transparent substrate 12, ITO films are formed by a sputtering method to be used as second transparent electrodes 15A and 15B, and on the second transparent electrodes, polyimide films are applied so that they have a film thickness of about 50 nm and baked, and their surfaces are subjected to a rubbing treatment to form alignment films (not shown). The rubbing treatments are made so that the rubbing treatment directions of the transparent substrates 11A and 12, and 11B and 12 are each the same when these pairs of transparent substrates are each opposed to form a cell as described later, and the rubbing treatment directions of the first and the second liquid crystal lenses are perpendicular to each other.

Then, the pairs of transparent substrates 11A and 12, and 11B and 12 are each laminated so that the Fresnel diffraction lens surface and the surface on which the transparent electrode is formed are opposed to each other, and press-bonded by using seals 13A and 13B respectively containing spacers, to form empty cells. Thereafter, through injection ports (not shown) of the empty cells, the above-mentioned nematic liquid crystal is injected and the injection ports are sealed to form liquid crystal cells to be first and second liquid crystal lenses 10A and 10B. The Abbe number $υ_D$ of these liquid crystal lenses is −3.46 according to the above-mentioned formula (2).

In this example, as a refractive lens 6 having a positive refractive power, a single lens is employed, which is produced by injection molding PMMA, which has a center thickness of 1.00 mm and whose both surfaces are aspherical surfaces 7 an 8. The shape of the refractive lens 6 of this example is determined by the above-mentioned formula (3). Table 3 shows coefficients thus determined. The Abbe number of this single lens is 57.4.

TABLE 3

| $r_1$ | −2.3657207 | $r_2$ | −1.4721873 |
|---|---|---|---|
| $k_1$ | 2.2626701 | $k_2$ | 0.9072558 |
| $a_{2,1}$ | 0.0729434 | $a_{2,2}$ | −0.078373 |
| $a_{4,1}$ | 0.0242198 | $a_{4,2}$ | −0.014689 |
| $a_{6,1}$ | −0.9518038 | $a_{6,2}$ | 0.026278 |
| $a_{8,1}$ | 2.4095525 | $a_{8,2}$ | −0.023388 |
| $a_{10,1}$ | −3.0124194 | $a_{10,2}$ | 0.003691 |

The laminated liquid crystal lens 10, the aspherical refractive lens 6 having a positive refractive power and an aperture 9, that are thus produced, are arranged so that their optical axes are agreed. Namely, they are arranged so that the distance from a surface of the liquid crystal lens 10 on a side opposite from the object side to the aperture 9 is 0.1 mm, and the distance from the aperture 9 to the refractive lens is 0.3 mm, to constitute the imaging lens of this example. The aperture 9 is produced so that its thickness is 0.1 mm.

With respect to the imaging lens of this example, the values of the above-mentioned formula (4) are calculated using the focal lengths of the first liquid crystal lens 2 and the second liquid crystal lens 4 are 22.31 mm and 22.30 mm respectively, and as a result, the values are both 0.83. Further, with respect to the imaging lens in a state of no lens function at a time of no voltage application, the value of formula (4) becomes 1.

In the imaging lens of this example, it is possible to change the focal length of the laminated liquid crystal lens 10 by changing presence or absence of voltage application to the transparent electrodes of the first and the second liquid crystal lenses, to change the focal length of the imaging lens. Namely, in the imaging lens of this example, when the liquid crystal lens has no lens function at a time of no voltage application, based on the infinite distance, the focal length is 3.2 mm, the back side focal length is 3.3 mm and the half angle of imaging field is 33°16'. By applying a voltage between transparent electrodes of each of the first and second liquid crystal lenses 10A and 10B by employing an external power source 19, it is possible to produce a lens function to change the focal length of the imaging lens.

Further, the imaging lens of this example has little chromatic aberration and has good imaging characteristics in both of the cases of no voltage application and voltage application to the liquid crystal lenses.

EXAMPLE 2

Figure 7:
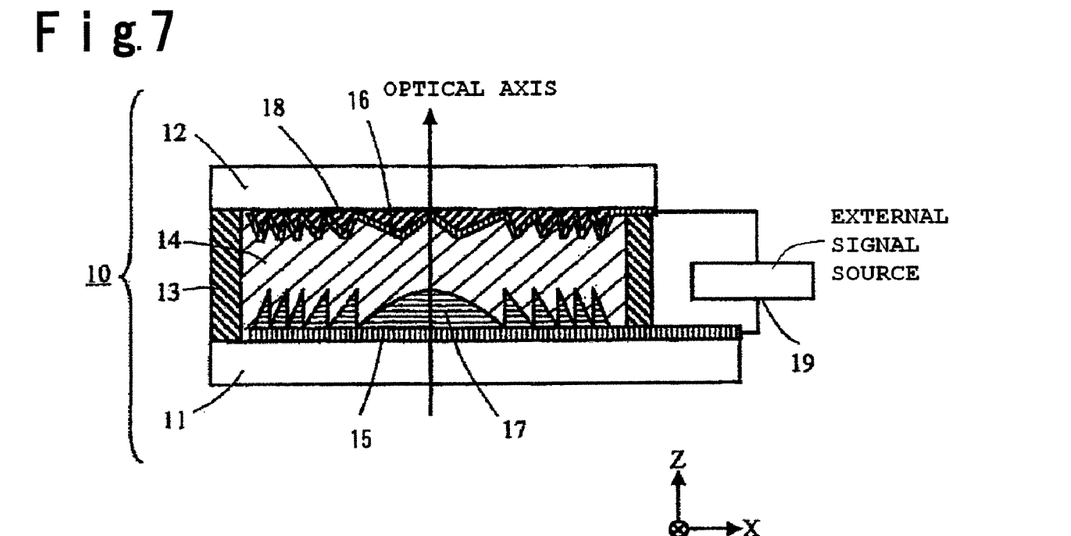
FIG. 7: A schematic cross-sectional view of a liquid crystal lens having a phase correction layer, employed in the imaging lens of the present invention.

The imaging lens of this example has the construction of the imaging lens of Example 1 except that the first and the second liquid crystal lenses are each replaced by the liquid crystal lens shown in the schematic cross-sectional view of FIG. 7. The first and the second liquid crystal lens portions of the imaging lens of this example, are described with reference to FIG. 7.

On one surface of the transparent substrate 11 made of quartz glass, an ITO film is formed by sputtering to be a transparent electrode 15. Further, on the transparent electrode 15, a $SiOxN_y$ film being an isotropic transparent material having a refractive index $n_F$ of 1.52 and a specific dielectric constant $\in_F$ of 4 is formed by sputtering so that its film thickness becomes 2.9 μm. Subsequently, by a photolithography technique and an etching technique, the $SiO_xN_y$ film is fabricated so as to correspond to the phase difference of the plot β of FIG. 3, to form a Fresnel diffraction lens surface 17 constituted by annular concave/convex portions symmetrical about an optical axis and having a saw-tooth shaped cross section of at most 2.1 μm deep.

Meanwhile, on a surface of the other transparent substrate 12 made of quartz glass, a $SiO_xN_y$ film being an isotropic transparent material having a refractive index $n_C$ of 1.52, is formed to have a film thickness of 0.27 μm, and subsequently, the $SiO_xN_y$ film is fabricated by an etching technique to form concave/convex portions of desired cross-sectional shape, to be a phase correction surface 18. The cross-sectional shape of the concave/convex portions is designed to cancel a phase shift produced due to the variation of substantial refractive index $n_{LC}(V_{LC}(r_m))$ of the liquid crystal layer 14 depending on its position $r_m$ in an annular zone when the liquid crystal lens is constituted, and the cross-sectional shape is convex in the central portion of each annular zone. Further, an ITO film is formed on a surface of the phase correction surface 18, to be a transparent electrode 16.

Thereafter, in the same manner as in Example 1, horizontal alignment films are formed on the outermost surfaces of the transparent substrates 11 and 12 to produce X direction alignment, a seal 13 is formed and the transparent substrates are press-bonded to form an empty cell having an inter-substrate distance of 12 μm. Thereafter, a nematic liquid crystal having an ordinary refractive index $n_o$ of 1.52, an extraordinary refractive index $n_e$ of 1.79 and a positive dielectric anisotropy, is injected into the empty cell to form a liquid crystal layer of homogeneous alignment, and the cell is sealed to form a liquid crystal lens 10.

With respect to the liquid crystal lens thus formed, a voltage is applied to the liquid crystal layer 14 by using an external power source, to evaluate the lens function. As the applied voltage is increased from 0 V, since the effective voltage $V_{LC}$ applied to the liquid crystal changes according to the shapes and the positions of the Fresnel diffraction lens surface 17 and the phase correction surface 18 as shown in formula (5), a phase difference OPD produced by the liquid crystal lens 10 changes according to the above-mentioned formula (7).

Figure 8:
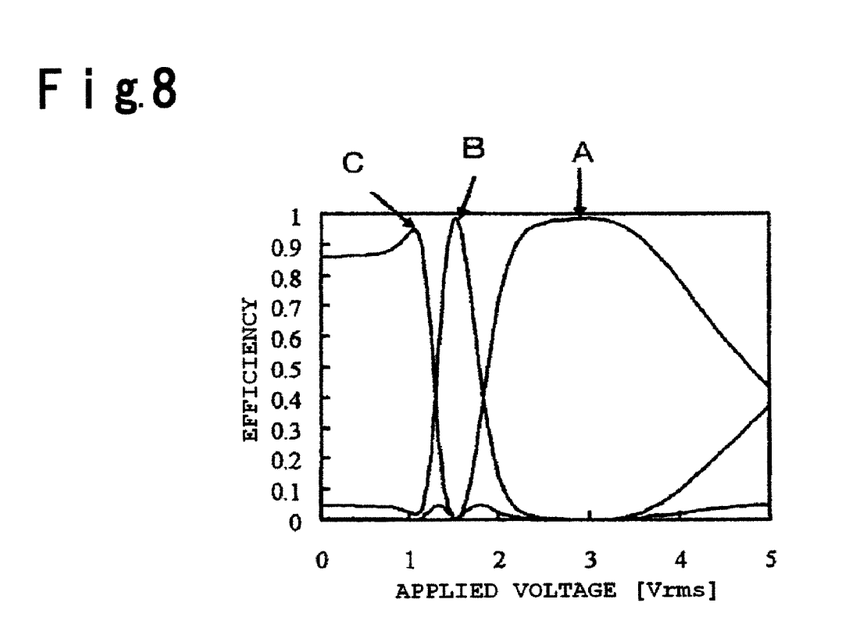
FIG. 8: A graph showing behaviors of imaging characteristics of liquid crystal lenses having positive, zero and negative refractive powers employed in the imaging lens of the present invention, in response to applied voltages. A cross-sectional view of a lens of an example of the present invention.

FIG. 8 is a view showing a Fresnel diffraction efficiency in response to a light flux of wavelength 520 nm incident into the liquid crystal lens element 10 of the first example. Here, in the figure, the lateral axis represents a voltage applied between the transparent electrodes 15 and 16.

To the liquid crystal lens, when linearly polarized light polarized in X direction is incident, the phase difference changes according to applied voltage as shown in FIG. 6(b), and wavefront of light transmitted through the liquid crystal lens element 10 changes. For example, at an applied voltage of 3.0 V, OP(1)<OP(0) is satisfied, the phase difference becomes −λ, and the incident plane wave is transformed into a convergent wavefront as +1-st Fresnel diffraction wave. The +1-st Fresnel diffraction efficiency becomes up to 98% at an applied voltage of 3.0 V as represented by the plot A of FIG. 8. In the same manner, at an applied voltage of 1.06 V, OP(1)>OP(0) is satisfied, the phase difference becomes +λ, and the incident plane wave is transformed into a divergent wavefront as −1-st Fresnel diffraction wave. The −1-st Fresnel diffraction efficiency becomes up to 95% at an applied voltage of 1.06 V as represented by the plot C of FIG. 8. On the other hand, at an applied voltage of 1.52 V, as in the case of applied voltage $V_0$ shown in FIG. 6(b), no phase difference and no phase difference shift is produced by the effect of the phase correction surface 18, and thus, the incident plane wave is transmitted as a 0-th Fresnel diffraction without changing its wavefront. The 0-th order Fresnel diffraction efficiency becomes the up to 98% at an applied voltage of 1.52 V as represented by the plot B of FIG. 8.

As described above, when the applied voltage is changed from 1.06 V, 1.52 V to 3.0 V, the liquid crystal lens of the above-mentioned construction functions as a "concave lens", "no lens function" and a "convex lens" respectively.

Then, into this liquid crystal lens, when linearly polarized light polarized in Y direction is incident, the liquid crystal layer 14 shows a substantial refractive index of $n_o$ and no refractive index difference is formed between the liquid crystal layer and the Fresnel diffraction lens surface, and thus, the liquid crystal layer 14 shows no lens function.

The laminated liquid crystal lens of the imaging lens of this example employs the above-mentioned liquid crystal lens as each of the first and the second liquid crystal lenses which are laminated so that their polarization directions producing lens functions are perpendicular to each other. Accordingly, in the imaging lens of this example, the lens characteristics are switchable among three stages by a voltage applied between the transparent electrodes of each liquid crystal lens. Further, the value of formula (4) is between 0 and 2 at each of the three-stage focal lengths among which the focal length of the liquid crystal lens is switchable, in the cases of the first liquid crystal lens and the second liquid crystal lens, which indicates that chromatic aberration is reduced to a low level and good imaging characteristics can be obtained at each of the three-stage focal lengths among which the focal length of liquid crystal lens is switchable.

INDUSTRIAL APPLICABILITY

The imaging lens of the present invention has no movable mechanism and has a simple construction, which produces little chromatic aberration. For this reason, the imaging lens is excellent in reliability, whose size can be small, which enables high speed switching of its lens function, and which can produce good imaging characteristics. Accordingly, the imaging lens is suitably usable for e.g. digital cameras or TV telephones which use photo-receiving elements such as small-sized CCDs or CMOSs as image sensors.

The entire disclosure of Japanese Patent Application No. 2005-126499 filed on Apr. 25, 2005 including specification, claims, drawings and summary is incorporated herein by reference in its entirety.

What is claimed is:

1. An imaging lens comprising a liquid crystal lens and a refractive lens laminated together;
the refractive lens being a refractive lens having a positive refractive power;
the liquid crystal lens comprising: a pair of transparent substrates disposed so as to be opposed to each other, a Fresnel diffraction lens surface and a transparent electrode formed on one of the opposed two surfaces of the pair of transparent substrates, a transparent electrode formed on the other one of the opposed two surfaces of the pair of transparent substrates, and a liquid crystal layer filling the concave/convex portion and sandwiched between the transparent substrates;

the Fresnel diffraction lens surface having a saw-tooth-shaped cross section and consisting of concentrically arranged annular concave/convex portions;

wherein the liquid crystal lens is configured so that the alignment state of the liquid crystal layer is changeable by applying a voltage to the liquid crystal layer by supplying a power from an external power source to the transparent electrode;

wherein the imaging lens is configured so that its focal length is changeable by changing the applied voltage to the liquid crystal lens, wherein the liquid crystal lens is a laminated liquid crystal lens comprising first and second liquid crystal lenses; and each of the first and second liquid crystal lenses are configured so that its refractive power for linearly polarized light of predetermined polarization direction is changeable by changing alignment state of liquid crystal layer by applying a voltage to the liquid crystal layer by supplying a power to the transparent electrodes from an external power source respectively;

wherein the laminated liquid crystal lens comprises the first liquid crystal lens and the second liquid crystal lens laminated so that their predetermined polarization directions are perpendicular to each other, and wherein the phase functions of the respective Fresnel diffraction lens surfaces of the respective liquid crystal lenses constituting the laminated liquid crystal lens, are different from each other.

2. The imaging lens according to claim 1, which satisfies the following formula:

$$0 \leq -(1/f_D + 1/f_R) \cdot (1/\upsilon_R) / \{1/(f_D \cdot \upsilon_D) + (1/f_R \cdot \upsilon_R)\} \leq 2$$

provided that the focal length and the Abbe number of the liquid crystal lens are $f_D$ and $\upsilon_D$, respectively, and the focal length and the Abbe number of the refractive lens having a positive refractive power are $f_R$ and $\upsilon_R$, respectively.

3. The imaging lens according to claim 1, wherein the liquid crystal layer shows the refractive index substantially equal to the ordinary refractive index $n_o$ of the liquid crystal for linearly polarized light polarized in a direction perpendicular to the predetermined polarization direction regardless of the magnitude of the applied voltage, and the liquid crystal lens satisfies any one of the following requirements (1) to (4):

(1) The liquid crystal layer of the liquid crystal lens is made of a nematic liquid crystal having a negative dielectric anisotropy, the alignment direction of liquid crystal molecules is substantially perpendicular to the substrate surfaces and the refractive index of the liquid crystal layer for linearly polarized light polarized in the predetermined polarization direction is substantially equal to the ordinary refractive index $n_o$ when the liquid crystal lens is in off-state of no voltage application, and the alignment direction is substantially parallel with substrate surfaces and the refractive index of the liquid crystal layer for linearly polarized light polarized in the predetermined polarization direction substantially equals to the extraordinary refractive index $n_e (n_e \neq n_o)$ when the liquid crystal lens is in on-state of voltage application, and the Fresnel diffraction lens surface is made of a transparent isotropic material of refractive index $n_F$ substantially equal to the ordinary refractive index $n_o$ of the liquid crystal layer;

(2) The liquid crystal layer of the liquid crystal lens is made of a nematic liquid crystal having a positive dielectric anisotropy, the alignment direction of liquid crystal molecules is substantially parallel with the substrate surfaces and the refractive index of the liquid crystal layer for linearly polarized light polarized in the predetermined polarization direction is substantially equal to the extraordinary refractive index $n_e$ when the liquid crystal lens is in off-state of no voltage application, and the alignment direction is substantially perpendicular to substrate surfaces and the refractive index of the liquid crystal layer for linearly polarized light polarized in the predetermined polarization direction substantially equals to the ordinary refractive index $n_o (n_e \neq n_o)$ when the liquid crystal lens is in on-state of voltage application, and the Fresnel diffraction lens surface is made of a transparent isotropic material of refractive index $n_F$ substantially equal to the ordinary refractive index $n_o$ of the liquid crystal layer;

(3) The liquid crystal layer of the liquid crystal lens is made of a nematic liquid crystal having a positive dielectric anisotropy, the alignment direction of liquid crystal molecules is substantially parallel with the substrate surfaces and the refractive index of the liquid crystal layer for linearly polarized light polarized in the predetermined polarization direction is substantially equal to the extraordinary refractive index $n_e$ when the liquid crystal lens is in off-state of no voltage application, and the alignment direction is substantially perpendicular to the substrate surfaces and the refractive index of the liquid crystal layer for linearly polarized light polarized in the predetermined polarization direction is substantially equal to the ordinary refractive index $n_o(n_e \neq n_o)$ when the liquid crystal lens is in on-state of voltage application, and the Fresnel diffraction lens surface is made of a transparent birefringent material having an extraordinary refractive index $n_{Fe}$ substantially equal to the extraordinary refractive index $n_e$ of the liquid crystal layer and an ordinary refractive index $n_{Fo}$ substantially equal to the ordinary refractive index $n_o$ of the liquid crystal layer, and the transparent birefringent material shows $n_{Fe}$ for linearly polarized light of the predetermined polarization direction and $n_{Fo}$ for linearly polarized light polarized in a direction perpendicular to the predetermined polarization direction;

(4) The same as (1) or (2) except that the Fresnel diffraction lens surface of the liquid crystal lens is made of a transparent isotropic material of refractive index $n_F$ substantially equal to the extraordinary refractive index $n_e$ of the liquid crystal layer instead of the transparent isotropic material of refractive index $n_F$ substantially equal to the ordinary refractive index $n_o$ of the liquid crystal layer, and the liquid crystal lens is provided with a polarization phase correction surface for canceling a phase difference occurred in linearly polarized light polarized in a direction perpendicular to the predetermined polarization direction.

4. The imaging lens according to claim 3, wherein at least requirement (1) is satisfied.

5. The imaging lens according to claim 3, wherein at least requirement (2) is satisfied.

6. The imaging lens according to claim 3, wherein at least requirement (3) is satisfied.

7. The imaging lens according to claim 3, wherein at least requirement (4) is satisfied.

8. An imaging lens whose mode is switchable between normal imaging and close-up imaging by switching the refractive power of the liquid crystal lens as defined in claim 1 between a state of substantially zero refractive power and a state of positive refractive power by switching presence and absence of the voltage application.

9. An imaging lens comprising a liquid crystal lens and a refractive lens laminated together;
the refractive lens being a refractive lens having a positive refractive power;
the liquid crystal lens comprising: a pair of transparent substrates disposed so as to be opposed to each other, a Fresnel diffraction lens surface and a transparent electrode formed on one of the opposed two surfaces of the pair of transparent substrates, a transparent electrode formed on the other one of the opposed two surfaces of the pair of transparent substrates, and a liquid crystal layer filling the concave/convex portion and sandwiched between the transparent substrates;
the Fresnel diffraction lens surface having a saw-tooth-shaped cross section and consisting of concentrically arranged annular concave/convex portions;
wherein the liquid crystal lens is configured so that the alignment state of the liquid crystal layer is changeable by applying a voltage to the liquid crystal layer by supplying a power from an external power source to the transparent electrode;
wherein the imaging lens is configured so that its focal length is changeable by changing the applied voltage to the liquid crystal lens,
wherein the liquid crystal lens is a liquid crystal lens in which $\Delta n \times d$ being a product of $\Delta n$ multiplied by a depth d of the concave/convex portion of the Fresnel diffraction lens satisfies the following formula:

$$390 \times m \leq \Delta n \times d \leq 650 \times m$$

(wherein m=1, 2 or 3)
provided that $|n_1-n_F|$ and $|n_2-n_F|$, whichever smaller, is defined as $\Delta n$, wherein $n_1$ and $n_2$ are refractive indexes of the liquid crystal layer for linearly polarized light of the predetermined polarization direction at no voltage application and at voltage application respectively, and $n_F$ is the refractive index of the Fresnel diffraction lens surface, and
wherein a phase correction surface having a concave/convex shape consisting of arranged annular shapes is formed on the opposed surface of said the other transparent substrate of the liquid crystal lens on which the Fresnel diffraction lens surface is not formed, so that the center of the phase correction surface agrees with the center of the Fresnel diffraction lens surface, and the transparent electrode is formed on the phase correction surface.

10. An imaging lens comprising a liquid crystal lens and a refractive lens laminated together;
the refractive lens being a refractive lens having a positive refractive power;
the liquid crystal lens comprising: a pair of transparent substrates disposed so as to be opposed to each other, a Fresnel diffraction lens surface and a transparent electrode formed on one of the opposed two surfaces of the pair of transparent substrates, a transparent electrode formed on the other one of the opposed two surfaces of the pair of transparent substrates, and a liquid crystal layer filling the concave/convex portion and sandwiched between the transparent substrates;
the Fresnel diffraction lens surface having a saw-tooth-shaped cross section and consisting of concentrically arranged annular concave/convex portions;
wherein the liquid crystal lens is configured so that the alignment state of the liquid crystal layer is changeable by applying a voltage to the liquid crystal layer by supplying a power from an external power source to the transparent electrode;
wherein the imaging lens is configured so that its focal length is changeable by changing the applied voltage to the liquid crystal lens,
wherein the liquid crystal lens is a laminated liquid crystal lens comprising first and second liquid crystal lenses; and
each of the first and second liquid crystal lenses are configured so that its refractive power for linearly polarized light of predetermined polarization direction is changeable by changing alignment state of liquid crystal layer by applying a voltage to the liquid crystal layer by supplying a power to the transparent electrodes from an external power source respectively;
wherein the laminated liquid crystal lens comprises the first liquid crystal lens and the second liquid crystal lens laminated so that their predetermined polarization directions are perpendicular to each other,
wherein the liquid crystal lens is a liquid crystal lens in which $\Delta n \times d$ being a product of $\Delta n$ multiplied by a depth d [nm] of the concave/convex portion of the Fresnel diffraction lens satisfies the following formula:

$$390 \times m \leq \Delta n \times d \leq 650 \times m$$

(wherein m=1, 2 or 3)
provided that $|n_1-n_F|$ and $|n_2-n_F|$, whichever smaller, is defined as $\Delta n$, wherein $n_1$ and $n_2$ are refractive indexes of the liquid crystal layer for linearly polarized light of the predetermined polarization direction at no voltage application and at voltage application respectively, and $n_F$ is the refractive index of the Fresnel diffraction lens surface,
wherein a phase correction surface having a concave/convex shape consisting of arranged annular shapes is formed on the opposed surface of said the other transparent substrate of the liquid crystal lens on which the Fresnel diffraction lens surface is not formed, so that the center of the phase correction surface agrees with the center of the Fresnel diffraction lens surface, and the transparent electrode is formed on the phase correction surface.

* * * * *